United States Patent
Kanaya (10) Patent No.: US 10,451,134 B2
(45) Date of Patent: Oct. 22, 2019

(54) ELECTROMAGNETIC ACTUATOR AND ACTIVE VIBRATION-DAMPING DEVICE

(71) Applicant: SUMITOMO RIKO COMPANY LIMITED, Komaki-shi, Aichi (JP)

(72) Inventor: Tomohiro Kanaya, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 185 days.

(21) Appl. No.: 15/475,773

(22) Filed: Mar. 31, 2017

(65) Prior Publication Data

US 2017/0314632 A1    Nov. 2, 2017

(30) Foreign Application Priority Data

Apr. 28, 2016    (JP) .................................. 2016-090724

(51) Int. Cl.
*H02K 33/16*    (2006.01)
*H02K 5/04*    (2006.01)
(Continued)

(52) U.S. Cl.
CPC ............ *F16F 7/1011* (2013.01); *F16F 7/104* (2013.01); *H02K 5/04* (2013.01); *H02K 5/24* (2013.01);
(Continued)

(58) Field of Classification Search
CPC ........ H02K 33/00; H02K 33/02; H02K 33/04; H02K 33/06; H02K 33/08; H02K 33/16;
(Continued)

(56) References Cited

U.S. PATENT DOCUMENTS

| 8,919,748 B2 | 12/2014 | Urayama et al. |
| 2004/0188903 A1* | 9/2004 | Goto ..................... F16F 13/268 267/140.13 |

(Continued)

FOREIGN PATENT DOCUMENTS

| JP | H02-7322 Y2 | 2/1990 |
| JP | 2000-58319 A | 2/2000 |

(Continued)

OTHER PUBLICATIONS

JP-2013060963-A (English Translation) (Year: 2013).*

(Continued)

*Primary Examiner* — Mang Tin Bik Lain
*Assistant Examiner* — Alexander Moraza
(74) *Attorney, Agent, or Firm* — Oliff PLC (57) ABSTRACT

An electromagnetic actuator including: an outer housing member wherein outer peripheral edges of lid members are fixed respectively to opposite axial sides of the outer tubular member; an inner axial member elastically-connected to the outer housing member by plate springs at opposite axial sides thereof such that central portions of the plate springs are attached to the inner axial member, while outer peripheral edges of the plate springs are clamped and fixed between the outer tubular member and the respective lid members; a stator and a mover having electromagnetic oscillation force between them securely-assembled to the outer housing member and the inner axial member; and integrally-formed seal rubber and stopper rubber provided at inner faces of the lid members to seal a fixation part to the outer tubular member and to cushion strike of the inner axial member against the lid members, respectively.

4 Claims, 1 Drawing Sheet

(51) Int. Cl.
*F16F 7/104* (2006.01)
*H02K 5/24* (2006.01)
*F16F 7/10* (2006.01)
*H02K 7/14* (2006.01)

(52) U.S. Cl.
CPC .......... *H02K 33/16* (2013.01); *F16F 2222/06* (2013.01); *F16F 2224/025* (2013.01); *F16F 2230/30* (2013.01); *H02K 7/14* (2013.01)

(58) Field of Classification Search
CPC ...... H02K 35/02; H02K 7/065; H02K 7/1876; H02K 7/1892; H02K 1/34
USPC ................. 310/12, 15–25, 30, 36, 75 A, 89; 267/140
See application file for complete search history.

(56) References Cited

U.S. PATENT DOCUMENTS

2008/0007125 A1* 1/2008 Koyama ................ F16F 7/1011
310/27
2011/0057367 A1* 3/2011 Hasegawa .............. F16F 7/1011
267/140.14
2011/0180980 A1* 7/2011 Urayama ............... F16F 7/1011
267/140.14

FOREIGN PATENT DOCUMENTS

| | | | |
|---|---|---|---|
| JP | 2000058319 A | * | 2/2000 |
| JP | 2000-234645 A | | 8/2000 |
| JP | 2011-109831 A | | 6/2011 |
| JP | 2013060963 A | * | 4/2013 |
| KR | 1020140021224 A | | 2/2014 |

OTHER PUBLICATIONS

JP-2000058319-A (English Translation) (Year: 2000).*
Oct. 31, 2018 Office Action issued in Chinese Patent Application No. 201710217455.2.
Jun. 13, 2019 Office Action Issued in Chinese Patent Application No. 201710217455.2.

* cited by examiner

ELECTROMAGNETIC ACTUATOR AND ACTIVE VIBRATION-DAMPING DEVICE

INCORPORATED BY REFERENCE

The disclosure of Japanese Patent Application No. 2016-090724 filed on Apr. 28, 2016 including the specification, drawings and abstract is incorporated herein by reference in its entirety.

BACKGROUND OF THE INVENTION

1. Field of the Invention

The present invention relates to an art concerning an electromagnetic actuator that generates an axial electromagnetic driving force between an inner axial member and an outer tubular member and relates to the electromagnetic actuator and an active vibration-damping device using the same.

2. Description of the Related Art

Generally, for an active vibration damper or vibration-damping device, which is referred as an active type, the electromagnetic actuator is used in order to obtain an oscillation force. The electromagnetic actuator, as shown in Japanese Unexamined Patent Publication No. JP-A-2011-109831 for example, has a structure wherein both axial sides of an inner axial member are elastically supported in relation to an outer tubular member by elastic members and the inner axial member is assembled to be movable relative to the outer tubular member in the axial direction. The electromagnetic force exerted between a stator and a mover acts on the inner axial member and the outer tubular member, thereby providing an axial oscillation force.

In the electromagnetic actuator of the conventional structure, used as an outer housing metal fitting is a metal fitting with a substantial shape of a bottomed circular tube. Into this outer housing metal fitting via the opening thereof, a plate spring, a coil member, and the like are inserted in due order and assembled to the outer housing metal fitting as they are superposed from the side of the bottom of the outer housing metal fitting.

However, it is impossible to visually check the inside of the housing from the bottom side in relation to the outer housing metal fitting of the substantial shape of a bottomed circular tube. This makes it difficult to check of the state of the elastic members and the coil member inserted in the housing inside, thereby leading to difficulty in securement of assembly accuracy for each part.

SUMMARY OF THE INVENTION

It is therefore one object of the present invention to provide an electromagnetic actuator and an active vibration-damping device of novel structure which are able to improve visibility of the inside of an outer housing member during assembly and facilitate assembly work of the parts including elastic members and a coil member, for example.

The above and/or optional objects of this invention may be attained according to at least one of the following modes of the invention. The following modes and/or elements employed in each mode of the invention may be adopted at any possible optional combinations.

A first mode of the present invention provides an electromagnetic actuator comprising: an inner axial member; an outer housing member including an outer tubular member and lid members fixed respectively to opposite axial sides of the outer tubular member at outer peripheral edges thereof; a stator and a mover configured to have an electromagnetic oscillation force exerted between them, the stator and the mover securely assembled to the outer housing member and the inner axial member; plate springs elastically connecting the outer housing member and the inner axial member at opposite axial sides thereof such that central portions of the plate springs are attached to the respective axial sides of the inner axial member, while outer peripheral edges of the plate springs are clamped and fixed between the respective axial sides of the outer tubular member and the respective lid members; a seal rubber provided at an inner face of each of the lid members so as to seal a fixation part of each of the lid members to the outer tubular member; and a stopper rubber provided at the inner face of each of the lid members and formed integrally with the seal rubber so as to cushion strike of axial ends of the inner axial member against the respective lid members.

According to the electromagnetic actuator constructed following this mode, the outer housing member has a unique structure wherein the lid members cover the both axial sides of the outer tubular member. This structure can keep the internal space of the outer housing member, in which the stator and the mover are disposed, as sealed off from the external space thereof. In addition, the structure can make it easy to check the state of the stator and the mover being assembled to the outer housing member, thereby improving ease of assembly.

Moreover, the seal rubber keeps sealability of the internal space and avoids entry of debris into narrow gaps etc. set between such components inside as the mover and the stator, thereby realizing stable operation with improved reliability.

The lid members on both sides constituting the outer housing member are also utilized to provide a stopper mechanism that limits axial displacement amount of the inner axial member. Consequently, the stopper mechanism can be realized with a small number of simple parts, thereby enabling the outer housing member to readily secure the stopper strength. Especially, the stopper rubber provided at the central portion of the lid member is formed integrally with the seal rubber provided at the outer periphery of the lid member, so that the inner face of the lid member is provided with a cover rubber layer. Therefore, compared to the electromagnetic actuator having separately-formed stopper rubber and seal rubber, it is possible to reduce the number of the parts and the manufacturing steps. In addition, it is also possible to suppress resonance of the lid member, which easily grows large, thereby effectively reducing or eliminating noise that is an expected trouble when the lid member is used as a stopper member.

A second mode of the present invention provides the electromagnetic actuator according to the first mode, further comprising an annular pressing member disposed on at least one of the axial sides of the outer tubular member, wherein an outer peripheral edge of the pressing member is clinched to the outer tubular member together with a corresponding one of the plate springs, and the pressing member protrudes further inward in an axial direction than the corresponding one of the plate springs so that an axial end of the stator is securely supported via the pressing member by the outer housing member.

According to the electromagnetic actuator structured following the present mode, it is possible to use a clinching structure for the plate spring in the outer housing member to assemble the pressing member. Besides, by adopting this pressing member, it becomes unnecessary to provide a stepped stator supporter in the outer tubular member and reduce the diameter of the opening, for example. That is, it is also possible to expand the opening at the edge of the outer tubular member in order to further facilitate visual check of the inside of the outer tubular member in assembly of the components.

A third mode of the present invention provides the electromagnetic actuator according to the first or second mode, further comprising a cover rubber layer formed to cover an inner face of at least one of the lid members across its entirety such that the stopper rubber and the seal rubber are integrally formed at a central portion and an outer periphery of the cover rubber layer.

According to the electromagnetic actuator constructed following the present mode, the cover rubber layer that covers the entire inner face of the lid member exerts more excellent vibration-damping action for the lid member. This more effectively suppresses troubles like noise caused by the resonance of the lid member and impulse of strike of the inner axial member against the lid member.

A fourth mode of the present invention provides the electromagnetic actuator according to any one of the first to third modes, further comprising a tubular clinching piece formed integrally with a first one of an axial opening of the outer tubular member and an outer peripheral part of a corresponding one of the lid members, the clinching piece being clinched to a second one of the axial opening of the outer tubular member and the outer peripheral part of the corresponding one of the lid members so that an outer peripheral end of a corresponding one of the plate springs is positioned in an axis-perpendicular direction by an inner peripheral face of the tubular clinching piece.

According to the electromagnetic actuator structured following the present mode, the outer peripheral face of the plate spring is abutted to the inner peripheral face of the tubular clinching piece. By this abutting action, the plate spring, which is assembled to the clinching part, is positioned in the axis-perpendicular direction and centered readily with high accuracy, thereby enabling assembly of the plate spring to the outer housing member.

A fifth mode of the present invention provides an active vibration-damping device comprising: the electromagnetic actuator according to any one of the first to fourth modes, wherein the stator is constituted by including a coil member and assembled to the outer housing member, while the mover is constituted by including a permanent magnet and assembled to the inner axial member; and an attachment part provided at the outer tubular member and configured to be attached to a member subject to vibration-damping.

With respect to the actuator constructed according to the present invention, adopted is the outer housing member wherein the lid members cover the both axial sides of the outer tubular member. This can secure sealability of the internal space of the outer housing member wherein the stator and the mover are disposed. In addition, this can facilitate check such as visual check during the assembly, thereby improving ease of manufacture. In the lid member, the seal rubber and the stopper rubber are integrally formed, so that it is possible to improve the sealabiliity of the outer housing member and realize the stopper function easily, while exhibiting suppression effect of noise due to the resonance of the lid member.

BRIEF DESCRIPTION OF THE DRAWINGS

The foregoing and/or other objects, features and advantages of the invention will become more apparent from the following description of a preferred embodiment with reference to the accompanying drawing in which like reference numerals designate like elements and wherein.

DETAILED DESCRIPTION OF PREFERRED EMBODIMENTS

There will be described below the embodiment of the present invention while referring to the drawing.

Figure 1:
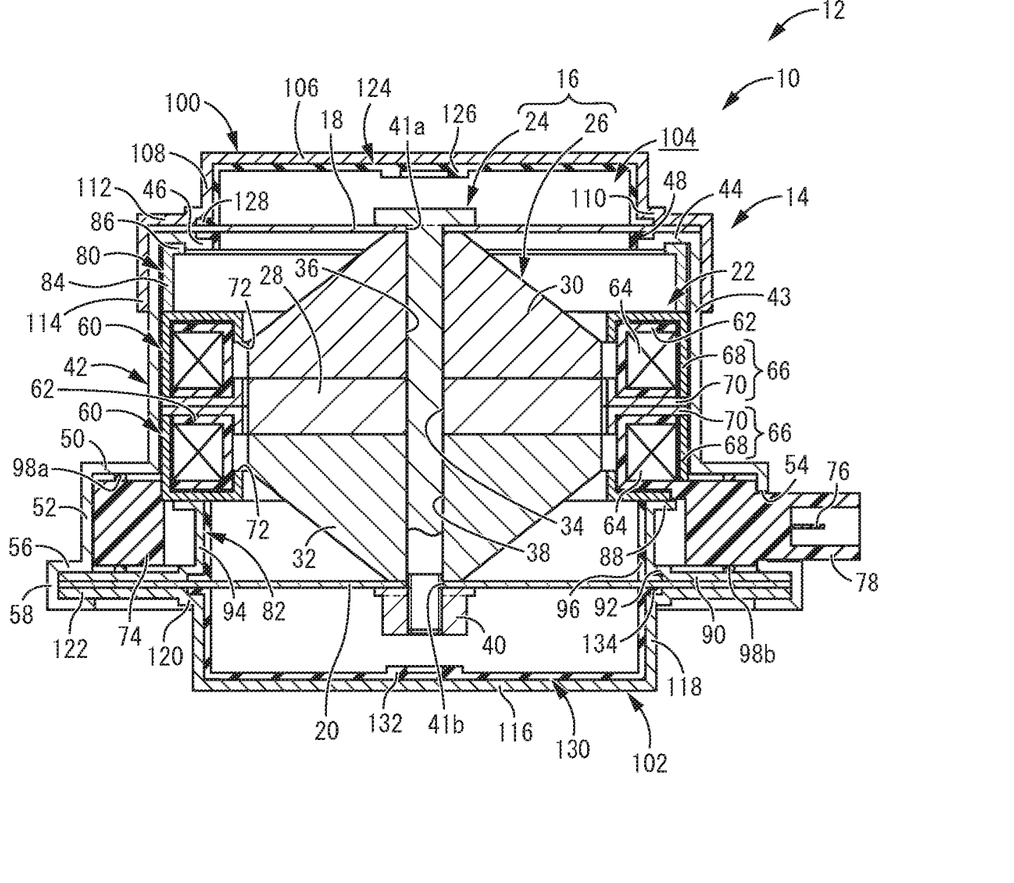
FIG. 1 is a longitudinal cross sectional view showing an active vibration-damping device using an electromagnetic actuator as a first embodiment of the present invention.

FIG. 1 shows an automotive active vibration-damping device 12 including an electromagnetic actuator 10 as a first embodiment of the present invention. With respect to this active vibration-damping device 12, an outer housing member 14 is securely attached to an automotive body or the like, which is a member subject to vibration-damping and the primary vibration system. A mass member 16 is disposed to be housed within the outer housing member 14 while being elastically connected to the outer housing member 14 by plate springs 18, 20 at opposite axial sides thereof so as to constitute a mass-spring system, which is the secondary vibration system. A stator 22 is attached to the outer housing member 14, while the mass member 16 is constituted by including an inner axial member 24 and a mover 26, which is attached to the inner axial member 24. The mover 26 is disposed internally or externally in relation to the stator 22 such that the mover 26 is displaceable relative to the stator 22 in the axial direction. In explanation hereinafter, unless otherwise stated, the up-down direction and the axial direction mean the up-down direction in FIG. 1, which is the direction in which the electromagnetic actuator 10 actuates and the input direction of the vibration to which the active vibration-damping effect by the active vibration-damping device 12 is exerted.

More specifically, the inner axial member 24 has a rod shape extending straight in the up-down direction. The mover 26 is securely assembled to the inner axial member 24.

The mover 26 is an armature in a structure wherein an upper yoke 30 and a lower yoke 32 as inner yokes are superposed on the respective upper-lower sides of a permanent magnet 28. In these permanent magnet 28 and upper and lower yokes 30, 32, through holes 34, 36, 38 are respectively formed extending on the central axes thereof in the axial direction. In the through holes 34, 36, 38, the inner axial member 24 is inserted. By a fixing nut 40 being threaded onto the inner axial member 24, a fastening force is exerted on the permanent magnet 28 and the upper and lower yokes 30, 32 in the overlap direction, thereby fixing them to the inner axial member 24.

The permanent magnet 28 constituting this mover 26 has a substantial shape of an annular plate with flat upper and lower surfaces expanding in the axis-perpendicular direction. The permanent magnet 28 is magnetized in the axial direction, thereby forming N and S magnetic poles on the respective upper and lower surfaces thereof. Note that, as the permanent magnet 28, although a ferrite based magnet and an alnico based magnet can be adopted, a rare-earth cobalt based magnet is preferably adopted.

Meanwhile, the upper and lower yokes 30, 32 are formed of a ferromagnet like iron, and it is possible to use the same material for each other. For the upper and lower yokes 30, 32, the overlap surfaces with the permanent magnet 28 have a flat surface shape corresponding to the permanent magnet 28, whereby the upper and lower yokes 30, 32 are superposed on the permanent magnet 28 with wide surfaces substantially in intimate contact with it.

In this embodiment, the outermost peripheral parts of the upper and lower yokes 30, 32 are formed to have the outer diameter dimension roughly equal to that of the permanent magnet 28. By the magnetic poles set at the both axial end faces of this permanent magnet 28, the outer peripheral surfaces of the outermost peripheral parts of the upper and lower yokes 30, 32 are provided with the respective one of N and S magnetic poles.

On the axial outer end surfaces for the upper and lower yokes 30, 32, the plate springs 18, 20 are superposed, respectively. The plate springs 18, 20 have passage holes 41a, 41b on their central axis, through which the inner axial member 24 is inserted. The central portions of the plate springs 18, 20 are superposed and fixed to the respective upper and lower yokes 30, 32.

With respect to the upper and lower yokes 30, 32, the outer peripheral surface has a shape whose diameter gets gradually smaller as it goes to the axial outside. This eliminates interference with the plate springs 18, 20 when the upper and lower yokes 30, 32 are displaced in the axial direction.

On the other hand, the outer housing member 14 has an outer tubular member 42 whose shape is substantially a large-diameter circular tube. This outer tubular member 42 is disposed co-axially with the inner axial member 24.

The axially intermediate part of the outer tubular member 42 is a middle straight part 43 extending substantially straightly, while the upper end of the outer tubular member 42 is bent to the inner peripheral side to form an annular inner flange part 44. This inner flange part 44 is provided with a stepped part, so that its protruding tip (inner peripheral end) 46 is positioned further to the axial inside than the other portion thereof. Across the inner peripheral face to the upper face of the protruding tip 46 of the inner flange part 44, an annular seal rubber 48 is fixed. In the single outer tubular member 42 before the plate spring 18 and the like are assembled to the outer tubular member 42, the upper end face of the seal rubber 48 may be disposed at substantially the same position of the upper end face of the inner flange part 44 or positioned slightly further to the axial outside than it.

The outer tubular member 42 has a larger diameter in the axially lower part. That is, a step 50 is formed to be located in the axially intermediate part of the outer tubular member 42, while a large diameter tube 52 is formed to extend downward from the outer peripheral end of the step 50. Through a portion on the periphery of the large diameter tube 52 (on the right side in FIG. 1), a terminal window 54 is formed. Via the terminal window 54, the inside and outside of the large diameter tube 52 are communicated to each other. A flange-shaped part 56 is formed at the lower end of the large diameter tube 52 and located in the lower opening of the outer tubular member 42. With the outer peripheral end of the flange-shaped part 56, a clinching part 58 is integrally formed as a clinching piece in a circular tube shape protruding downward (to the side of a second lid member 102 described later).

Each axial opening of the outer tubular member 42 is preferably set with a size that is large enough. Specifically, for example, at least one opening of the outer tubular member 42 has a larger diameter dimension than the outer diameter of each component to be assembled in the inside of the outer tubular member 42 so that an outer yoke 66 etc. described later can be inserted in the inside and assembled thereto during the assembly. Each opening of the outer tubular member 42 is desired to have an opening inner diameter larger than the inner diameter dimension of the stator 22 in order to facilitate check such as visual check of the assembly state. In this embodiment, both openings of the outer tubular member 42 have an opening inner diameter larger than the inner diameter dimension of the outer yokes 66, which are positioned to face the magnetic poles of the upper and lower yokes 30, 32 fixed to the inner axial member 24 so as to constitute faces subjected to the magnetic effect. Note that the opening inner diameter of this outer tubular member 42 is desirably kept also in a state of the product wherein either of lid members 100, 102 is assembled, so as to facilitate the check such as visual check as well during the assembly of the first and second lid members 100, 102 described later.

The stator 22 is housed within the outer tubular member 42. The stator 22, which has a substantial shape of a thick circular tube as a whole, is securely assembled such that it is positioned roughly at the central part in the axial direction of the outer tubular member 42 along the inner peripheral face of the middle straight part 43.

In details, the stator 22 includes two coil members 60, 60 which are arranged in the up-down direction. The coil members 60, 60 have a structure wherein the outer yokes 66, 66 are assembled to coils 64, 64, which include bobbins 62, 62 formed of a resin and conductive metal wires wound around them. Accordingly, the whole shape of the coil member 60 is roughly a thick circular tube with a large diameter.

The outer yoke 66, which is formed of a ferromagnet like iron, includes a first yoke 68 that is overlapped with the coil 64 as covering it from the axial outer face to the outer peripheral face thereof and a second yoke 70 that is overlapped with the coil 64 as covering the axial inner face thereof.

All inner peripheral ends of the first yoke 68 and the second yoke 70 that are overlapped with the respective axial faces of the coil 64 extend in the axial direction from the respective up-down sides with their own prescribed lengths as covering the inner peripheral face of the coil 64. The ends of the first yoke 68 and the second yoke 70, which come close to one another from upside and downside in the axial direction on the inner peripheral face of the coil 64, face one another while being spaced apart therefrom with a prescribed distance in the axial direction.

Thus, around each of the upper and lower coils 64, 64, the outer yoke 66 including the first and second yokes 68, 70 forms a magnetic path, which guides magnetic flux generated through energization to the coils 64, 64. On this magnetic path, magnetic gaps 72, 72 are formed on the side of the inner peripheral faces of the coils 64, 64, between the opposite faces of the first yoke 68 and the second yoke 70 in the axial direction. These magnetic gaps 72, 72 expand continuously along the entire periphery in the peripheral direction with a substantially constant space.

In this embodiment, for the coil 64 of the upper coil member 60 and the coil 64 of the lower coil member 60, the wires are wound around the bobbins 62, 62 in the adverse directions relative to each other, thereby generating magnetic flux in the adverse directions through the energization. The coils 64, 64 of the upper and lower coil members 60, 60 may be constituted by mutually continuous wires.

Here, the upper and lower coil members 60, 60 are substantially symmetrical and integrally formed having the bobbins 62, 62 of integral structure. With the lower bobbin 62, a power feed spacer 74 is integrally formed so as to protrude to the outer peripheral side. This power feed spacer 74, which is in a large-diameter annular shape as a whole, is formed of a rigid synthetic resin, for example. At a part on the periphery of the power feed spacer 74, a connecting part 78 is formed including a power feed terminal 76 for supplying the upper and lower coils 64, 64 with electricity from the outside.

The power feed spacer 74 is disposed in the large diameter tube 52 of the outer tubular member 42 such that the upper end face of the power feed spacer 74 is overlapped with the step 50 of the outer tubular member 42. Moreover, the connecting part 78 of the power feed spacer 74 is inserted through the terminal window 54 formed through the large diameter tube 52, so that the tip part of the connecting part 78 including the power feed terminal 76 protrudes on the outer peripheral face of the outer tubular member 42 to be exposed to the outside.

Owing to power feed from the outside to the coils 64, 64 via the power feed terminal 76, the magnetic flux is generated around the coils 64, 64 and guided by the magnetic path constituted by the outer yokes 66, 66. As a result, the magnetic poles are formed on both axial sides of the magnetic gaps 72, 72.

The axial distance between the upper and lower magnetic gaps 72, 72 in the stator 22 is substantially equal to the axial thickness dimension of the permanent magnet 28. The outer peripheral surfaces of the outermost peripheral parts of the upper and lower yokes 30, 32 where the magnetic poles are formed are disposed to face the magnetic gaps 72, 72 with a radial space in between.

By so doing, when a magnetic field is generated for the upper and lower magnetic gaps 72, 72 through the energization to the coils 64, 64 of the stator 22, an axial magnetic attractive force is exerted on the outermost peripheral part of one of the upper and lower yokes 30 (32), while an axial magnetic repulsive force is exerted on the outermost peripheral part of the other of the upper and lower yokes 32 (30). Based on the effect of these magnetic forces, a driving force to either axial side acts on the mover 26 depending on the energization direction to the coils 64, 64 of the stator 22. Control of interval and direction of the energization to the coils 64, 64 makes it possible to exert an axial oscillation force on the mover 26, and hence the inner axial member 24 by prescribed periods.

The stator 22 that has these coil members 60, 60 is assembled to the outer tubular member 42 by being inserted into the outer tubular member 42 from below such that the coil members 60, 60 are disposed in the axially intermediate part of the outer tubular member 42. Furthermore, the stator 22 (the upper and lower coil members 60, 60) and the power feed spacer 74 of this structure are securely supported within the outer tubular member 42 in a state of being clamped in the axial direction by a first pressing member 80 and a second pressing member 82.

The first pressing member 80, which has a substantially tubular shape as a whole, includes a straight-shaped part 84 that extends linearly in the up-down direction. At the upper end of the straight-shaped part 84, an inner flange-shaped part 86 is formed to bend peripherally inward and expand in a ring shape.

This first pressing member 80 is inserted into the outer tubular member 42 via the lower opening thereof. As a result, the first pressing member 80 is positioned in the middle straight part 43 of the outer tubular member 42 such that the inner flange-shaped part 86 is fitted into the space surrounded by the inner flange part 44, the protruding tip 46 of the inner flange part 44, and the middle straight part 43.

Additionally, the second pressing member 82 is fitted into the outer tubular member 42 via the lower opening of the outer tubular member 42. The whole shape of the second pressing member 82 is substantially a circular tube having the axial length roughly equal to or slightly smaller than that of the large diameter tube 52 of the outer tubular member 42. In the second pressing member 82, the part located at the axially upper end is an annular pressing plate 88, while the part located at the axially lower end is an annular fixing plate 90. In other words, in the second pressing member 82, the pressing plate 88 protrudes further axially inward (upward in FIG. 1) than the fixing plate 90. Besides, these pressing plate 88 and fixing plate 90 are connected to one another at their own inner peripheral ends by a tubular portion 94, which has a step section 92.

This second pressing member 82 is securely assembled to the lower opening of the outer tubular member 42 by the outer peripheral end of the fixing plate 90 being superposed to the flange-shaped part 56 of the outer tubular member 42 and clinched by the clinching part 58.

Across the inner peripheral face of the second pressing member 82 to the lower face of the step section 92, a seal rubber 96 is fixed. In the single second pressing member 82 before being assembled to the outer tubular member 42, the lower face of the seal rubber 96 may be positioned at a height substantially the same as or lower than the lower face of the fixing plate 90.

Via the lower opening of the outer tubular member 42, the first pressing member 80, the stator 22 (the coil members 60, 60) and the power feed spacer 74, and the second pressing member 82 are inserted into the outer tubular member 42 in order. By so doing, the coil members 60, 60 and the power feed spacer 74 are axially clamped and supported by the first and second pressing members 80, 82 in the outer tubular member 42.

Specifically, the upper end of the upper coil member 60 is supported by the inner flange part 44 of the outer tubular member 42 via the first pressing member 80, while the lower end of the lower coil member 60 is supported by the pressing plate 88 of the second pressing member 82. In other words, the lower end of the lower coil member 60 is securely supported by the outer tubular member 42 via the second pressing member 82. Also, the upper end of the power feed spacer 74 is supported by the step 50 of the outer tubular member 42, while the lower end thereof is supported by the fixing plate 90 of the second pressing member 82.

On the portions that support the power feed spacer 74 in the outer tubular member 42, namely the lower face of the step 50 and the upper face of the fixing plate 90 of the second pressing member 82, interposing seal rubbers 98a, 98b are provided. Owing to this, the power feed spacer 74 is supported in cushioned fashion relative to the outer tubular member 42, while entry of debris or water through the terminal window 54 is avoided, thereby contributing to the sealing of a housing area 104 described later. These seal rubbers 98a, 98b may be fixed on the upper and lower faces of the power feed spacer 74.

It is also possible to fix the same seal rubber on the portions that support the coil members 60, 60 in relation to the outer tubular member 42, i.e., the lower face of the first pressing member 80 and the upper face of the pressing plate 88 of the second pressing member 82, or the upper and lower faces of the upper and lower coil members 60, 60. Moreover, it is possible as well to provide the same seal rubber between the outer tubular member 42 and the coil members 60, 60 in the radial direction.

To the upper and lower openings of the outer tubular member 42 constructed as described above, the first lid member 100 and the second lid member 102 are superposed, respectively. The outer peripheral edges of the first and second lid members 100, 102 are fixed to the upper and lower openings of the outer tubular member 42, thereby constituting the outer housing member 14 including the housing area 104 as a sealed internal space.

Each of the first and second lid members 100, 102 has a substantial shape of a bottomed, stepped tube, wherein the central portion is in a shape of an inverted bowl or a bowl that swells axially outward. This shape avoids interference of the upper and lower plate springs 18, 20, while allowing axial displacement of the mover 26 within the outer housing member 14.

Specifically, the first lid member 100 includes an upper base wall 106 in its center, and a tubular peripheral wall 108 formed extending downward from the outer peripheral end of the upper base wall 106. At the lower edge of the peripheral wall 108, an annular first stepped part 110 is provided expanding to the outer peripheral side. From the lower end of this first stepped part 110, an upper flange-shaped part 112 extends and expands out in a ring shape to the outer peripheral side. At the outer peripheral end of the upper flange-shaped part 112, a tubular part 114 is integrally formed to have a circular tube shape protruding downward (to the side of the outer tubular member 42).

On the other hand, the second lid member 102 includes a lower base wall 116 in its center, and a tubular peripheral wall 118 formed extending upward from the outer peripheral end of the lower base wall 116. Note that a second stepped part 120 is provided at the upper end of the peripheral wall 118 to expand to the outer peripheral side in a ring shape. In addition, from the upper end of the second stepped part 120, a lower flange-shaped part 122 extends and expands out in a ring shape to the outer peripheral side.

Here, on the inner face of the first lid member 100, substantially across its entirety, a first cover rubber layer 124 is fixed. Specifically, the first cover rubber layer 124 is provided on the lower face of the upper base wall 106, the inner face of the peripheral wall 108, and the lower face of the first stepped part 110, continuously across them. For this first cover rubber layer 124, the portion other than the central portion has a roughly constant thickness dimension, while the central portion has a ring-shaped thick part formed thereon. This thick part is a first stopper rubber 126 that limits axial displacement of the inner axial member 24 to the upper side in cushioned fashion. Besides, the outer periphery of the first cover rubber layer 124, namely the portion located on the lower side of the first stepped part 110 while expanding in a ring shape, is a seal rubber 128 which seals the fixation section where the first lid member 100 and the outer tubular member 42 are mutually fixed. Specifically, the first cover rubber layer 124 is integrally provided with the first stopper rubber 126 and the seal rubber 128.

The lower face of the seal rubber 128 may be positioned at the same height as the lower face of the upper flange-shaped part 112, or it may be positioned at a height below the lower face of the upper flange-shaped part 112 in the single first lid member 100 before being assembled to the outer tubular member 42, for example.

Moreover, on the inner face of the second lid member 102, substantially across its entirety, a second cover rubber layer 130 is fixed. Specifically, the second cover rubber layer 130 is provided on the upper face of the lower base wall 116, the inner face of the peripheral wall 118, and the upper face of the second stepped part 120, continuously across them. For this second cover rubber layer 130 as well, the portion other than the central portion has a roughly constant thickness dimension, while the central portion has a ring-shaped thick part formed thereon. This thick part is a second stopper rubber 132 that limits axial displacement of the inner axial member 24 to the lower side in cushioned fashion. Besides, the outer periphery of the second cover rubber layer 130, namely the portion located on the upper side of the second stepped part 120 while expanding in a ring shape, is a seal rubber 134 which seals the fixation section where the second lid member 102 and the outer tubular member 42 (the second pressing member 82) are mutually fixed. Specifically, the second cover rubber layer 130 is integrally provided with the second stopper rubber 132 and the seal rubber 134.

The upper face of the seal rubber 134 may be positioned at the same height as the upper face of the lower flange-shaped part 122, or it may be positioned at a height above the upper face of the lower flange-shaped part 122 in the single second lid member 102 before being assembled to the outer tubular member 42, for example.

In addition, the first and second cover rubber layers 124, 130 can be formed separately from and fixed later to the first and second lid members 100, 102, or they can take the form of an integrally vulcanization molded component incorporating the first lid member 100 or the second lid member 102.

By means of inserting the upper end of the outer tubular member 42 in the tubular part 114 of the first lid member 100 structured as described above in a press-fit state, and the like, the first lid member 100 is fitted and fixed to the upper end opening of the outer tubular member 42. Specifically, the outer peripheral edge of the plate spring 18 is superposed on the upper end face of the inner flange part 44 of the outer tubular member 42, and then the first lid member 100 is assembled to them from above. By so doing, the outer peripheral edge of the plate spring 18 is clamped by the upper flange-shaped part 112 of the first lid member 100 and the inner flange part 44 of the outer tubular member 42 in the axial direction. Therefore, the upper flange-shaped part 112 and the tubular part 114 of the first lid member 100 are fixation parts to the outer tubular member 42.

On the inner peripheral side of the fixation section where these outer tubular member 42 and first lid member 100 are mutually fixed, the seal rubbers 48, 128 are provided at the outer tubular member 42 and the first lid member 100, respectively. These upper and lower seal rubbers 48, 128 also axially clamp and support the outer peripheral edge of the plate spring 18. As a result, the seal rubbers 48, 128 fluidtightly seal the fixation section where the outer tubular member 42 and the first lid member 100 are mutually fixed. Namely, the seal rubber 128 is provided to the inner face of the first lid member 100 at the fixation part thereof to the outer tubular member 42 so as to seal therebetween.

Meanwhile, the outer peripheral edge of the lower flange-shaped part 122 of the second lid member 102 is superposed to the fixing plate 90 of the second pressing member 82, and then clinched together with the fixing plate 90 by the clinching part 58 of the outer tubular member 42. In more details, the plate spring 20 is disposed between the second pressing member 82 and the second lid member 102. These second pressing member 82, plate spring 20, and second lid member 102 are inserted in order from the lower opening of the outer tubular member 42, with their outer peripheral faces being positioned in the axis-perpendicular direction by contact with the inner peripheral face of the tubular clinching part 58. Then, by bending the lower end of the clinching part 58 to the inner peripheral side, the second pressing member 82, the plate spring 20, and the second lid member 102 are securely assembled in a state of being positioned in the axis-perpendicular direction to the lower opening of the outer tubular member 42. Therefore, the second pressing member 82 is securely assembled to the outer tubular member 42, while the outer peripheral edge of the plate spring 20 is clamped in the axial direction between the fixing plate 90 of the second pressing member 82 and the lower flange-shaped part 122 of the second lid member 102.

Accordingly, the lower flange-shaped part 122 of the second lid member 102 is a fixation part to the outer tubular member 42 (and the second pressing member 82). On the inner peripheral side of the fixation section where the second pressing member 82 and the second lid member 102 are mutually fixed, the seal rubbers 96, 134 are provided at the second pressing member 82 and the second lid member 102, respectively. These upper and lower seal rubbers 96, 134 also axially clamp and support the outer peripheral edge of the plate spring 20. As a result, the seal rubbers 96, 134 fluidtightly seal the fixation section where the outer tubular member 42 (and the second pressing member 82) and the second lid member 102 are mutually fixed. Namely, the seal rubber 134 is provided to the inner face of the second lid member 102 at the fixation part thereof to the outer tubular member 42 so as to seal therebetween.

To the outer housing member 14 constructed as described above, the outer peripheral edges of the upper and lower plate springs 18, 20 are fixed. As a result, the inner axial member 24, to which the mover 26 is assembled, is elastically supported at the proximity to the opposite axial ends thereof via the plate springs 18, 20 by the outer housing member 14. The length dimension of the inner axial member 24 is shorter than the axial dimension between the opposite faces of the first and second lid members 100, 102, whereby the whole inner axial member 24 is housed within the housing area 104.

In this way, the inner axial member 24 is disposed in the outer housing member 14, so that the upper end of the inner axial member 24 and the first stopper rubber 126, which is provided on the inner face of the first lid member 100, face one another as mutually separated in the axial direction. This first stopper rubber 126 cushions strike of the inner axial member 24 against the first lid member 100. In addition to that, the fixing nut 40, which is provided at the lower end of the inner axial member 24, and the second stopper rubber 132, which is provided on the inner face of the second lid member 102, face one another as mutually separated in the axial direction. This second stopper rubber 132 cushions strike of the inner axial member 24 against the second lid member 102.

In the plate springs 18, 20 of this embodiment, a plurality of through windows are formed extending in a spiral form. The through windows secure large spring rigidity in the axis-perpendicular direction and adjust spring characteristics in the axial direction. Moreover, the elasticity of the upper and lower plate springs 18, 20 retains the mover 26 in the initial axial position relative to the stator 22 such that the mover 26 rapidly comes back to the initial position when the driving force by the power supply from the outside is cancelled.

The electromagnetic actuator 10 of this structure constitutes the active vibration-damping device 12, by the outer tubular member 42 of the outer housing member 14 being securely attached to a member subject to vibration-damping of the primary vibration system, via a not-shown attachment part or an attachment part constituted by a portion of the outer tubular member 42. In this attachment state, the power feed to the coils 64, 64 of the stator 22 is controlled depending on the axial vibration subject to damping. Thus, the mover 26 and the inner axial member 24 constituting the secondary vibration system are oscillated in the axial direction relative to the stator 22 and the outer housing member 14 so as to obtain the target vibration-damping effect.

In this electromagnetic actuator 10, the outer tubular member 42 opens to the both axial sides. The stator 22 and the mover 26 are assembled through the openings on the both axial sides. This makes it possible to assemble the stator 22 and the mover 26 while visually checking them, thereby improving ease of assembly.

The first and second lid members 100, 102 are fixed at the both axial sides of the outer tubular member 42, thereby constituting the outer housing member 14 including the housing area 104. At the first and second lid members 100, 102, the seal rubbers 128, 134 are provided to seal the fixation parts in relation to the outer tubular member 42. This secures the sealability of the housing area 104, thereby improving water and dust proof properties.

Also, at the first and second lid members 100, 102, the first and second stopper rubbers 126, 132 are provided to limit the up-down displacement of the inner axial member 24 in cushioned fashion. This effectively avoids noise caused by the strike of the inner axial member 24 against the first and second lid members 100, 102.

Especially, the seal rubber 128 and the first stopper rubber 126 are formed integrally with each other, so are the seal rubber 134 and the second stopper rubber 132 (the first cover rubber layer 124 and the second cover rubber layer 130). Accordingly, it is possible to restrain increase of the number of parts, the number of assembly steps, and the like.

In this embodiment, the first cover rubber layer 124 and the second cover rubber layer 130 are provided respectively on the inner faces of the first lid member 100 and the second lid member 102 across substantially the whole faces. This can more effectively avoid noise and impulse accompanying the strike of the inner axial member 24 against the first and second lid members 100, 102.

Moreover, by using the first pressing member 80 and the second pressing member 82 of the present embodiment, it is also possible to skillfully support the coil members 60, 60 and the power feed spacer 74 in the outer tubular member 42.

Furthermore, in the present embodiment, to the flange-shaped part 56 provided at the lower opening of the outer tubular member 42, the outer peripheral ends of the second pressing member 82, the plate spring 20, and the second lid member 102 are superposed and then clinched by the clinching part 58. Specifically, when the second pressing member 82, the plate spring 20, and the second lid member 102 are inserted into the tubular clinching part 58, the outer peripheral faces of them get in contact with the inner peripheral face of the clinching part 58, thereby exerting positioning effect in the axis-perpendicular direction. This centers and assembles the second pressing member 82, the plate spring 20, and the second lid member 102 in relation to the outer tubular member 42, thereby improving efficiency and accuracy of operation.

There has been described the embodiment of the present invention. However, the present invention is not limited by the specific description of the embodiment. For example, the coil members constituting the stator are not limited to the two coil members overlapped in the up-down direction. That is, it is also possible to provide only one coil member, or to provide three or more coil members overlapped in the axial direction. Besides, with respect to the upper and lower coil members 60, 60 in the aforesaid embodiment, the coils 64, 64 wound in the adverse directions relative to each other are adopted, but it is also possible to use upper and lower coils wound in the same direction.

Regarding the mover as well, it is possible to adopt various structures to generate axial driving force using magnetic effect caused through the energization to the coil members, depending on the employed structure of the stator. For example, it is also possible to set magnetic poles in multiple steps by overlapping the permanent magnets and the yokes mutually in multiple steps. Additionally, the permanent magnet is not indispensable, and it is possible as well to use a structure for which the mover formed of a ferromagnetic material is adopted and an axial driving force is generated using a magnetic absorptive force in relation to the magnetic poles formed in the coil members.

In the aforementioned embodiment, the coil members 60, 60 are disposed on the side of the stator 22, while the permanent magnet 28 is disposed on the side of the mover 26. To the contrary, it is also possible to dispose the coil members on the side of the mover, while disposing the permanent magnet on the side of the stator. This structure can be realized for example by using the features shown in Japanese Unexamined Patent Publication No. JP-A-2000-234645.

Besides, in the above-described embodiment, the first lid member 100 is fitted in and fixed on the upper opening of the outer tubular member 42, but it can be clinched in the same way as the second lid member 102, for example. Specifically, it is also possible to provide an annular outer flange part protruding to the outer peripheral side at the upper end of the outer tubular member, for example. This outer flange part is superposed to the upper flange-shaped part 112 of the first lid member 100, and is fixed by bending the lower end of the tubular part 114, which extends out downward from the outer peripheral end of the upper flange-shaped part 112, to the inner peripheral side.

In the aforementioned embodiment, the clinching piece (clinching part) 58 for clinching the second lid member 102 etc. extends out downward from the outer peripheral end of the flange-shaped part 56 provided at the lower opening of the outer tubular member 42. However, the clinching piece may extend out upward from the outer peripheral edge of the second lid member, for example.

Additionally, in the above-cited embodiment, the first cover rubber layer 124 and the second cover rubber layer 130 are provided on the inner faces of the first lid member 100 and the second lid member 102 substantially across their whole faces, but it is not always required. That is, as long as the seal rubber and the stopper rubber are integrally formed, the rubbers may be provided partially in the inner faces of the first and second lid members.

Furthermore, there is no limitation in the specific structure of the attachment part in the outer tubular member that should be attached to the member subject to the vibration-damping. For example, where the outer tubular member is fixed in a press-fit way to an attachment hole provided at the member subject to the vibration-damping, the attachment part is constituted by the outer tubular member itself. Alternatively, a bracket part protruding outward from the outer tubular member may be securely formed to constitute the attachment part, or a bolt or a rivet attached to the attachment hole provided at the outer tubular member can constitute the attachment part.

In addition to them all, other embodiments including various changes, amendments, modifications and the like on the basis of the knowledge of the skilled person, which are not recited one by one, can be used to realize the present invention. As long as these embodiments do not deviate from the concept of this invention, they are all included in the range of the present invention.

What is claimed is:

1. An electromagnetic actuator comprising:
   an inner axial member;
   an outer housing member including an outer tubular member and lid members fixed respectively to opposite axial sides of the outer tubular member at outer peripheral edges thereof;
   a stator and a mover configured to have an electromagnetic oscillation force exerted between them, the stator and the mover securely assembled to the outer housing member and the inner axial member;
   plate springs elastically connecting the outer housing member and the inner axial member at opposite axial sides thereof such that central portions of the plate springs are attached to the respective axial sides of the inner axial member, while outer peripheral edges of the plate springs are clamped and fixed between the respective axial sides of the outer tubular member and the respective lid members;
   a seal rubber provided at an inner face of each of the lid members so as to seal a fixation part of each of the lid members to the outer tubular member;
   a stopper rubber provided at the inner face of each of the lid members and formed integrally with the seal rubber so as to cushion strike of axial ends of the inner axial member against the respective lid members; and
   an annular pressing member formed separately from the outer tubular member and the stator and disposed on at least one of the axial sides of the outer tubular member, the annular pressing member having:
      a tubular portion;
      a pressing plate located at an axially inner end of the tubular portion while spreading radially outwardly; and
      a fixing plate located at an axially outer end of the tubular portion while spreading radially outwardly,
   wherein an outer peripheral edge of the fixing plate of the pressing member is disposed so as to project further outward in a radial direction than the stator and is clinched to the outer tubular member together with a corresponding one of the plate springs, and
   the pressing plate of the pressing member protrudes further inward in an axial direction than the corresponding one of the plate springs and abuts on an axial end of the stator so that the axial end of the stator is securely supported via the pressing member by the outer housing member.

2. The electromagnetic actuator according to claim 1, further comprising a cover rubber layer formed to cover an inner face of at least one of the lid members across its entirety such that the stopper rubber and the seal rubber are integrally formed at a central portion and an outer periphery of the cover rubber layer.

3. The electromagnetic actuator according to claim 1, further comprising a tubular clinching piece formed integrally with either of an axial opening of the outer tubular member and an outer peripheral part of a corresponding one of the lid members, the clinching piece being clinched to the other of the axial opening of the outer tubular member and the outer peripheral part of the corresponding one of the lid members so that an outer peripheral end of a corresponding one of the plate springs is positioned in an axis-perpendicular direction by an inner peripheral face of the tubular clinching piece.

4. An active vibration-damping device comprising:
the electromagnetic actuator according to claim 1, wherein the stator is constituted by including a coil member and assembled to the outer housing member, while the mover is constituted by including a permanent magnet and assembled to the inner axial member.

* * * * *

UNITED STATES PATENT AND TRADEMARK OFFICE
CERTIFICATE OF CORRECTION

| | |
|---|---|
| PATENT NO. | : 10,451,134 B2 |
| APPLICATION NO. | : 15/475773 |
| DATED | : October 22, 2019 |
| INVENTOR(S) | : Tomohiro Kanaya |

It is certified that error appears in the above-identified patent and that said Letters Patent is hereby corrected as shown below:

On the Title Page

Item (12) delete "Kanaya" and insert --Kanaya et al.--; and
Item (72) should read as follows:
(72) Inventors: Tomohiro KANAYA, Komaki (JP); Takaaki SHIMIZU, Tokyo (JP); Yasunori KOBAYASHI, Tokyo (JP)

Signed and Sealed this
Seventh Day of June, 2022

Katherine Kelly Vidal
*Director of the United States Patent and Trademark Office*